March 10, 1936.  C. N. TEETOR  2,033,209
DUMPING VEHICLE
Filed Sept. 13, 1935  2 Sheets-Sheet 1
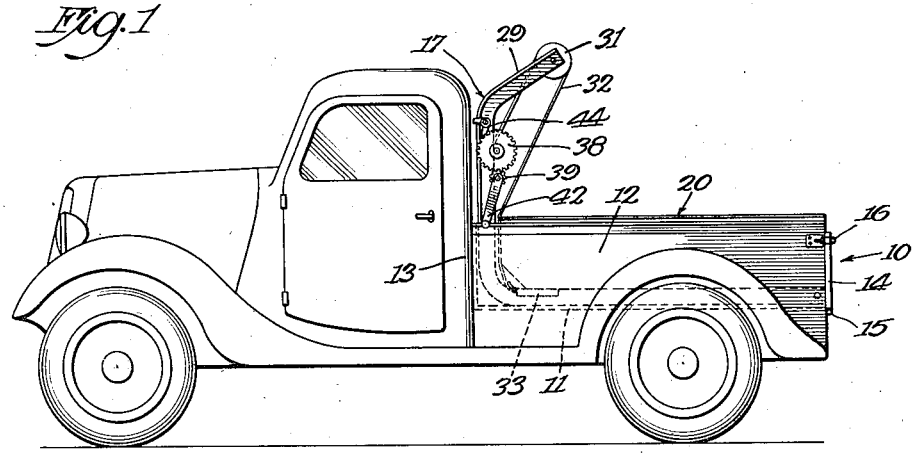
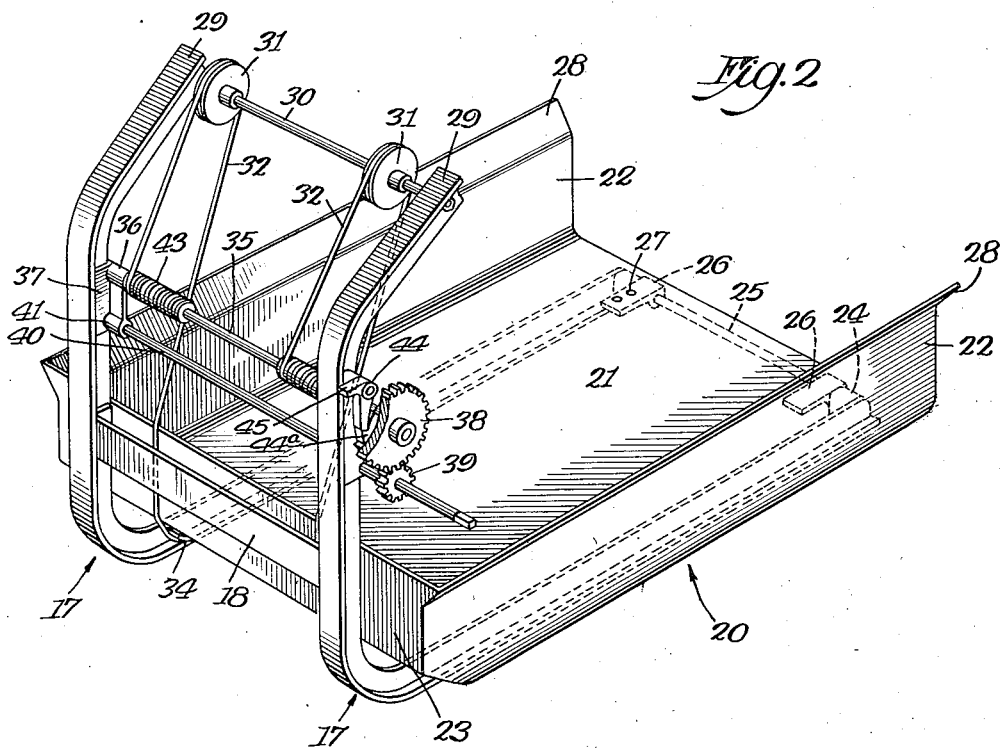
Inventor:
Charles N. Teetor
By Davis, Macauley, May, Lindsay & Smith, Attys.

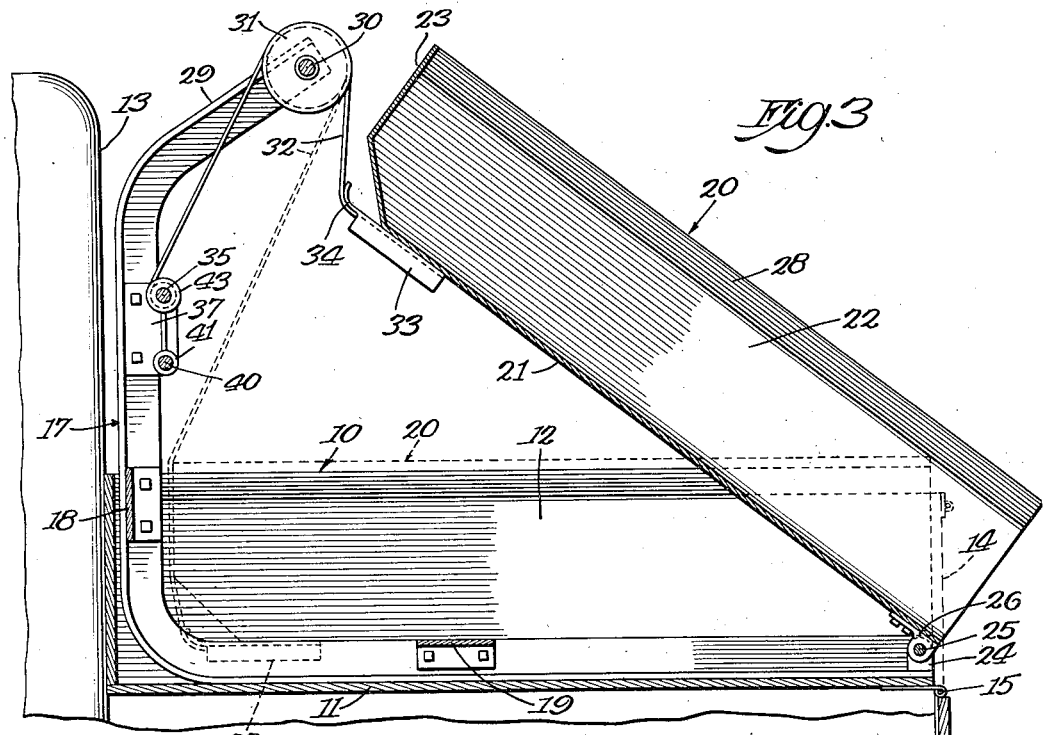

Patented Mar. 10, 1936

2,033,209

UNITED STATES PATENT OFFICE 2,033,209

DUMPING VEHICLE

Charles N. Teetor, Hagerstown, Ind.

Application September 13, 1935, Serial No. 40,355

3 Claims. (Cl. 298—19)

My invention relates to dumping vehicles and it has to do more particularly with dump box structure and operating mechanism therefor.

One of the objects of my invention is to provide for the conversion of an ordinary vehicle body into a dumping body without change in or attachment to the latter.

Another object is to provide a self-contained dumping unit including a tiltable dump box, tilting mechanism and a common support therefor that may be mounted in unitary fashion upon various forms of vehicle bodies without fastening the same to the vehicle body and without any part of the unit forming a part of the vehicle body.

Additional objects are to provide a dump box having provision for preventing material carried thereby from spilling or otherwise finding its way onto the vehicle body; to provide an arrangement wherein the vehicle body is provided with a tail gate that serves to prevent displacement of the dumping unit and also serves as an enclosure for the dump box; and to provide a simple and inexpensive dumping unit of the foregoing character which is strong, durable, inexpensive and efficient, and which may be easily and quickly applied to various forms of vehicle bodies for dumping in different directions.

Other objects and advantages will become apparent as this description progresses and by reference to the drawings wherein,—

Figure 1 is a side elevational view of a motor truck having my invention applied thereto;

Fig. 2 is an enlarged and separated perspective view of the dumping unit shown in Fig. 1, certain of the parts being cut away to more clearly illustrate the same;

Fig. 3 is an enlarged vertical sectional view of the dumping mechanism of Fig. 1 taken substantially on line 3—3 of Fig. 4, the parts being shown in dumping position; and Fig. 4 is a rear elevational view of the structure shown in Fig. 3, the parts being shown in non-dumping position.

In the drawings, I have shown my invention as applied to a motor truck having a main body 10, including a bottom wall 11 and side walls 12. The front end of the body 10 is closed by the truck cab portion 13 and its rear end is closed by a tail gate 14 having its lower edge pivotally supported at 15 so as to swing downwardly to the open position of Fig. 3 or upwardly to the closed position of Fig. 1. Suitable latch mechanism 16 is provided adjacent the upper edge of the tail gate for securely holding the latter in its closed position. The body 10 may be secured to the truck chassis in any desired manner so that it remains in a fixed horizontal position (Fig. 1). According to my invention, the body 10 may be readily and quickly converted into a dump body by applying thereto a detachable and self-contained dumping unit, one form of which will now be described.

The dumping unit (Fig. 2) includes a pair of L-shaped frame members 17 each, preferably, of T-shape in cross section. These frame members are held in spaced-relation by cross members 18 and 19 (Figs. 2 and 3) suitably secured to the T-stem portions of the frame members.

A dump box 20 having bottom, side and end walls 21, 22, 23 is pivotally secured to the rear ends of the horizontal portions of the frame members 17. More particularly, the rear ends of the frame members are provided with bearings 24 in which the ends of a cross shaft 25 are journaled. The shaft 25 is secured to the bottom wall of the dump box by brackets 26 and suitable fastening means 27. The dump box 20 rests upon the horizontal portions of the frame members 17 in its non-dumping position (Figs. 1 and 4) and it is at that time additionally supported by the brace strip or cross member 19.

The dump box 20 has approximately the shape and dimensions of the main truck body 10 and dumping unit 17, 20 may be placed within the truck body and supported detachably therein without fastening the unit to the truck body or in any way changing the construction of the latter. In the form shown in the drawings, the rear end of the dump box is normally open so that the tail gate 14 of the main body serves as a closure therefor, and this tail gate, also, when closed, positively guards against accidental endwise displacement of the dumping unit. It will also be noted that the side walls 22 of the dump box have their upper portions 28 inclined upwardly and outwardly so as to overlie the upper edges of the side walls 12 of the main body thereby preventing material from being spilled or otherwise finding its way from the dump box into the main body 10. It will be understood that the upper portions of the side walls of the main body may be tapered similarly to the upper portions of the side walls of the dump box, or, if desired, they may extend vertically.

The dump box 20 is adapted to be raised about its pivotal support in order to dump the contents thereof (Fig. 3) and, to that end, I provide hoisting mechanism as a self-contained part of the dumping unit. More particularly, I provide hoisting mechanism that is supported by the vertical legs of the frame members 17 as follows: The upper ends 29 of the vertical frame portions are turned rearwardly so as to overlie somewhat the forward end of the dump box 20 in its normal non-dumping position. The rearwardly turned frame ends 29 support a cross shaft 30 upon which are journaled a pair of sheaves or pulleys 31 over which pass cables 32 connected at one end by suitable brackets 33 to the forward bottom portion of the dump box 20. To guard against undue wear on the cable in the raising and lowering of the dump box, the lower forward corner portion of the dump box is shaped to extend downwardly and rearwardly to avoid contact with the cable. I also provide upwardly rounded guards 34 adjacent the brackets 33 that deflect the cables forwardly and guide them upwardly away from the lower forward end of the dump box.

The cables 32 are actuated to raise and lower the dump box by a suitable windlass 35 having its opposite ends journaled in bearings 36 carried by brackets 37 secured to the vertical legs of the frame members 17 below the shaft 30 and sheaves 31. The right hand end of windlass 35 (Fig. 2) extends to one side of the adjacent frame member 17 and carries a gear 38 which is in mesh with a pinion 39 carried by a shaft 40 suitably journaled in bearings 41 carried by the brackets 37. The end of the shaft 40 adjacent the pinion 39 is extended and formed non-circular to receive a suitable handle member 42 (Fig. 4) adapted to be actuated to rotate the shaft 40 and, in turn, impart rotational movement to the windlass 35 through the gear 38 and pinion 39.

The cables 32, after passing from the dump box over the pulleys 31 are secured to suitable spiral windways 43 on the windlass 35; and, as the windlass is rotated in counterclockwise direction, the cable winds in spiral fashion along the windways, as best illustrated in Figs. 2 and 4. As the cables 32 wind along the windways 43, the forward end of the dump box is raised, as will be well understood, the extent of raising the same being dependent upon the extent to which the cable is wound around the windlass. It will be appreciated that this dump box raising or tilting action is facilitated, and the range of raising movement is increased, by turning the upper ends of the vertical legs of the frame members 17 rearwardly to overlie the forward ends of the dump box.

A suitable pawl member is journaled on the right-hand frame member 17, and it is so positioned that it normally engages the teeth of a ratchet 44ᵃ carried by the gear 38. This pawl and ratchet structure opposes clockwise movement of the gear 38 so that the dump box may be raised and held in any desired position. When it is desired to lower the dump box, the pawl member 44 may be manually operated by grasping the handle portion thereof to disengage the same from the ratchet 44ᵃ and permit the gear 38 to rotate clockwise under the control of the operating handle 42.

It is believed that the operation and advantages of my invention will be well understood from the foregoing description. A unitary dump unit is provided. It may be quickly applied to a vehicle body without fastening means and without in any way changing, attaching to, or marring the main body of the vehicle. By employing a hoisting mechanism which is a self-contained part of the unit, tendency toward displacement of the unit in the dumping operation is avoided. The unit may well be used with a body of the flat type which does not have confining side and end walls. In that case, the dump box may be provided with its own tail gate, and it may be positioned to dump in any desired direction. Also, in the use of a truck body like that illustrated, the dumping unit may well be mounted crosswise thereof to dump laterally of the vehicle with assured efficiency.

It is to be further understood that while I have shown only one form of structure embodying my invention, other changes in details and arrangements of parts may be made without departing from the spirit and scope of my invention as defined by the claims that follow.

I claim:

1. In structure of the class described, the combination with a vehicle body having bottom and side walls and a tail gate hinged at its lower edge for closing the rear end thereof, of a self-contained dumping unit removably mounted within said body without connection to said body, said unit being restrained against lateral movement by said body side walls and including a frame extending substantially throughout the length of said body and having a horizontal portion adapted to seat upon said body bottom and also having a vertical portion, a dump box having approximately the shape and dimensions of said body and having an open rear end that is pivotally connected to the rear end of said horizontal frame portion with its forward end free to be raised and lowered, and means carried by said vertical frame portion for raising and lowering the forward end of said dump box, said body tail gate serving as a closure for the rear end of said dump box in non-dumping position of the latter and also serving to prevent accidental rearward shift movement of said unit relative to said body.

2. In a structure of the class described, the combination with a vehicle body having bottom and side walls and a tail gate hinged at its lower edge for closing the rear end thereof, of a self-contained dumping unit removably mounted within said body without connection to the latter, said unit being restrained against lateral movement by said body side walls and including a frame extending to the rear of said body, a dump box having approximately the shape and dimensions of said body and having an open rear end that is pivotally connected to the rear end of said frame with its forward end free to be raised and lowered, and means carried by said frame for raising and lowering the forward end of the dump box, said body tail gate serving as a closure for the rear end of said dump box in non-dumping position of the latter and also serving to prevent accidental rearward shifting of said unit relative to said body when the tail gate is closed.

3. In a structure of the class described, the combination with a vehicle body having bottom and side walls and a tail gate hinged at its lower edge for closing the rear end thereof, of a self-contained dumping unit removably mounted within said body without connection to the latter, said unit being restrained against lateral movement by said body side walls and including a frame extending substantially throughout the length of said body and having a horizontal portion adapted to rest upon said body bottom and also having a vertical portion with the upper end thereof turned rearwardly a substantial extent to overlie said horizontal portion in spaced relation, a dump box having approximately the shape and dimensions of said body and having an open rear end that is pivotally connected to the rear end of said horizontal frame portion with its forward end free to be raised and lowered, and means carried by said vertical frame portion for raising and lowering the forward end of said dump box and including cables attached to the forward end portion of said dump box and extending upwardly to said raising and lowering means carried by the vertical frame portion, and guide deflectors carried by said dump box for deflecting said cables away from the front end of said dump box, said body tail gate serving as a closure for the rear end of said dump box in non-dumping position of the latter and also serving to prevent accidental rearward shifting movement of said unit relative to said box.

CHARLES N. TEETOR.